United States Patent [19]

Herold

[11] Patent Number: 5,341,545
[45] Date of Patent: Aug. 30, 1994

[54] BELT FASTENING ARRANGEMENT

[75] Inventor: Wolfgang Herold, Main, Fed. Rep. of Germany

[73] Assignee: MATO Maschinen-und Metallwarenfabrik Curt. Matthaei GmbH & Co. KG, Offenbach, Fed. Rep. of Germany

[21] Appl. No.: 4,913

[22] Filed: Jan. 19, 1993

[51] Int. Cl.$^5$ ............................................. F16G 3/00
[52] U.S. Cl. ............................................ 24/33 P; 24/31 B; 24/31 W
[58] Field of Search ............... 24/33 P, 33 C, 33 M, 24/32, 31 R, 31 B, 31 W

[56] References Cited

U.S. PATENT DOCUMENTS

| | | | |
|---|---|---|---|
| 1,612,024 | 12/1926 | Jacobs | 24/31 W |
| 1,653,791 | 12/1927 | Tobolla | 24/33 C |
| 3,071,830 | 1/1963 | Stolz | 24/33 C |
| 3,076,736 | 2/1963 | McHugh | 24/31 B |
| 3,327,359 | 6/1967 | Wiese | 24/31 W |
| 4,315,349 | 2/1982 | Stolz | 24/33 P |
| 4,653,156 | 3/1987 | Stolz et al. | 24/31 B |

FOREIGN PATENT DOCUMENTS

0326506B1  7/1991  European Pat. Off. .

*Primary Examiner*—Victor N. Sakran
*Attorney, Agent, or Firm*—Price, Heneveld, Cooper, DeWitt & Litton

[57] ABSTRACT

A fastening arrangement is provided to interconnect the opposite ends of a belt or the like, and includes a plurality of individual belt fasteners arranged side-by-side across the width of the belt ends. The belt fasteners include mounting portions which are impressed into the opposing faces of the belt end, such that the overall width of the belt tends to thereby expand and distort. A longitudinally inelastic tensioning element is positioned along a major portion of at least one of the belt ends, and is attached thereto, so as to generally maintain the overall width of the associated belt end and resist distortion thereof.

34 Claims, 4 Drawing Sheets

BELT FASTENING ARRANGEMENT

BACKGROUND OF THE INVENTION

The present invention relates to arrangements for interconnecting the opposite ends of belts and the like, and in particular to a unique fastener system and method therefor.

Belt fasteners are generally known in the art to interconnect the opposite ends of belts or the like, such as conveyor belts, etc. It is a well known procedure to connect the ends of conveyor belts and/or conveyor belt sections by using joining elements or belt fasteners that are in turn mounted on the belt ends. The belt fasteners may be attached to the belt ends by different arrangements, including screw-like fasteners, rivet-like fasteners, staple-like fasteners, and other similar arrangements. One type of joining system comprises a plurality of U-shaped belt fasteners, wherein the belt ends are inserted between the free ends of the U-shaped belt fasteners, and the looped ends protrude outwardly from the belt ends in a comb-like fashion, wherein the looped ends of like belt fasteners on the opposite belt ends are intermeshed with the same. A coupling rod or pin is then inserted through the intermeshed loops of the belt fasteners so as to hingedly interconnect the opposite belt ends. Another type of joining system comprises a plurality of plate type belt fasteners which are arranged on opposite faces of the belt ends to bridge or overlap the junction point between the belt ends. The plate type belt fasteners are similarly fastened to the opposite ends of the belt, and form a non-hinged type of connection therebetween.

When either the U-shaped or plate type belt fasteners are attached to the opposite belt ends by screws, rivets, staples, or other similar fasteners, the belt is typically compressed in the direction of its thickness, that is at right angles to its opposite faces or primary plane. In other words the mounting portions of the fasteners are impressed or inserted into the opposite faces of the belt ends, so as to pinch or nip the carcass of the belt therebetween. As a result of the impression of the mounting portions of the belt fasteners into the faces of the belt, the belt will tend to expand or yield in a sideways direction, such that the overall lateral width of the belt end tends to expand or "grow". As a result of this expansion, the conveyor belt ends tend to distort in an uncontrolled manner. Two of the primary types of belt distortion include undulations or corrugations in the nature of waves that appear across the width of the belt end, and result from the fact that the belt fasteners are not pressed into the belt carcass at the exact same depth. Another common type of distortion is when the belt end cups into a generally arcuate or curved shape, which results from the fact that the opposite sides of the belt sometimes have a different resiliency or durometer. Other types of distortion may also occur as the belt fasteners are mounted onto the opposite ends of the belt.

As a result of the distortion of the belt ends, including undulations, cupping, and other forms of belt distortion, the usefulness of the belt is adversely effected, and can even lead to premature failure. For instance, when U-shaped belt fasteners are used, belt distortion makes it extremely difficult, if not impossible, to align and intermesh the belt fasteners on the opposite ends of the belt, so that the coupling rod or pin can be inserted through the intermeshed loops. Similar problems are also encountered when plate type belt fasteners are used. Another problem caused by the undulation and cupped deformation of the belt ends is that the conveyor belt will be under higher stress when in operation. For example, such belt distortion typically causes the outer edge areas of the conveyor belt to be under higher tensile stress the center area, which contributes to premature failure.

The above-noted problems of belt distortion are addressed in European Patent 0,326,506 B1, which teaches cutting the belt ends in a concave curve shape, and the fastening of the joining elements upon a hook insertion guide rail that is bent into the corresponding shape. As a result of this technique, the leading edge of the belt tends to be more straight when the belt ends are to be connected. However, this type of arrangement does not avoid the formation of corrugations or undulations across the width of the belt ends. Furthermore, this type of splicing technique, as well as the associated equipment required, is very costly and time consuming, and not very practical under actual operating conditions.

SUMMARY OF THE INVENTION

One aspect of the present invention is to provide a method for interconnecting opposite ends of a belt or the like, comprising providing a plurality of individual belt fasteners, each with spaced apart mounting portions between which an associated belt end is positioned. The individual belt fasteners are positioned side-by-side across the width of both of the belt ends. A longitudinally, inelastic tensioning element is positioned transversely across a major portion of at least one of the belt ends, and is attached thereto. The individual belt fasteners are mounted to the belt ends by impressing the mounting portions of each into the opposing faces of the belt ends, such that the tensioning element resists lateral expansion of the one belt end, and alleviates distortion thereof.

Preferably, the belt interconnecting method includes longitudinally pretensing the tensioning element prior to mounting the belt fasteners, so as to better resist belt distortion. Also, the tensioning element attaching step preferably comprises positioning the tensioning element between one face of the belt end and the adjacent mounting portions of the associated belt fasteners before the fastener mounting step, such that as the mounting portions of the belt fasteners are impressed into the opposite faces of the belt ends and, the tensioning element is contemporaneously pressed into the selected belt face to frictionally interconnect the same with the one belt end and each of the associated belt fasteners.

Another aspect of the present invention is an arrangement for interconnecting opposite ends of the belt, comprising a plurality of individual belt fasteners arranged side-by-side across the width of the belt ends to securely interconnect the same, wherein the belt fasteners include spaced apart mounting portions which are sequentially converged against and impressed into the opposite faces of the belt ends, such that the overall width of the belt ends tends to thereby expand and distort. An elongate tensioning element extends along a major portion of at least one of the belt ends, and is positioned between at least one of the belt faces and the adjacent mounting portions of the belt fasteners. The tensioning element is longitudinally inelastic, whereby as the mounting portions of the belt fasteners are sequentially impressed into the opposite faces of the belt ends, the tensioning element is contemporaneously pressed into the one belt face, and thereby frictionally interconnected with the associated belt end and the belt fastener, so as to generally maintain the overall width of the associated belt end, and resist distortion thereof.

The principal objects of the present invention are to provide a fastener system for efficiently and effectively interconnecting opposing ends of a belt, or the like. The fastener arrangement is securely mounted to the opposite ends of the belt, while minimizing distortion thereof, particularly with respect to both lateral undulations and end cupping. The present fastener system alleviates stress concentrations on the outer sides of the belt, and improves durability and operating life. The fastener system has an uncomplicated design which is efficient in use, economical to manufacture, and is particularly well adapted for the proposed use.

These and other advantages of the invention will be further understood and appreciated by those skilled in the art by reference to the following written specification, claims, and appended drawings.

DETAILED DESCRIPTION OF THE PREFERRED EMBODIMENTS

For purposes of description herein, the terms "upper", "lower", "right", "left", "rear", "front", "vertical", "horizontal", and derivatives thereof shall relate to the invention as oriented in FIGS. 1–4. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
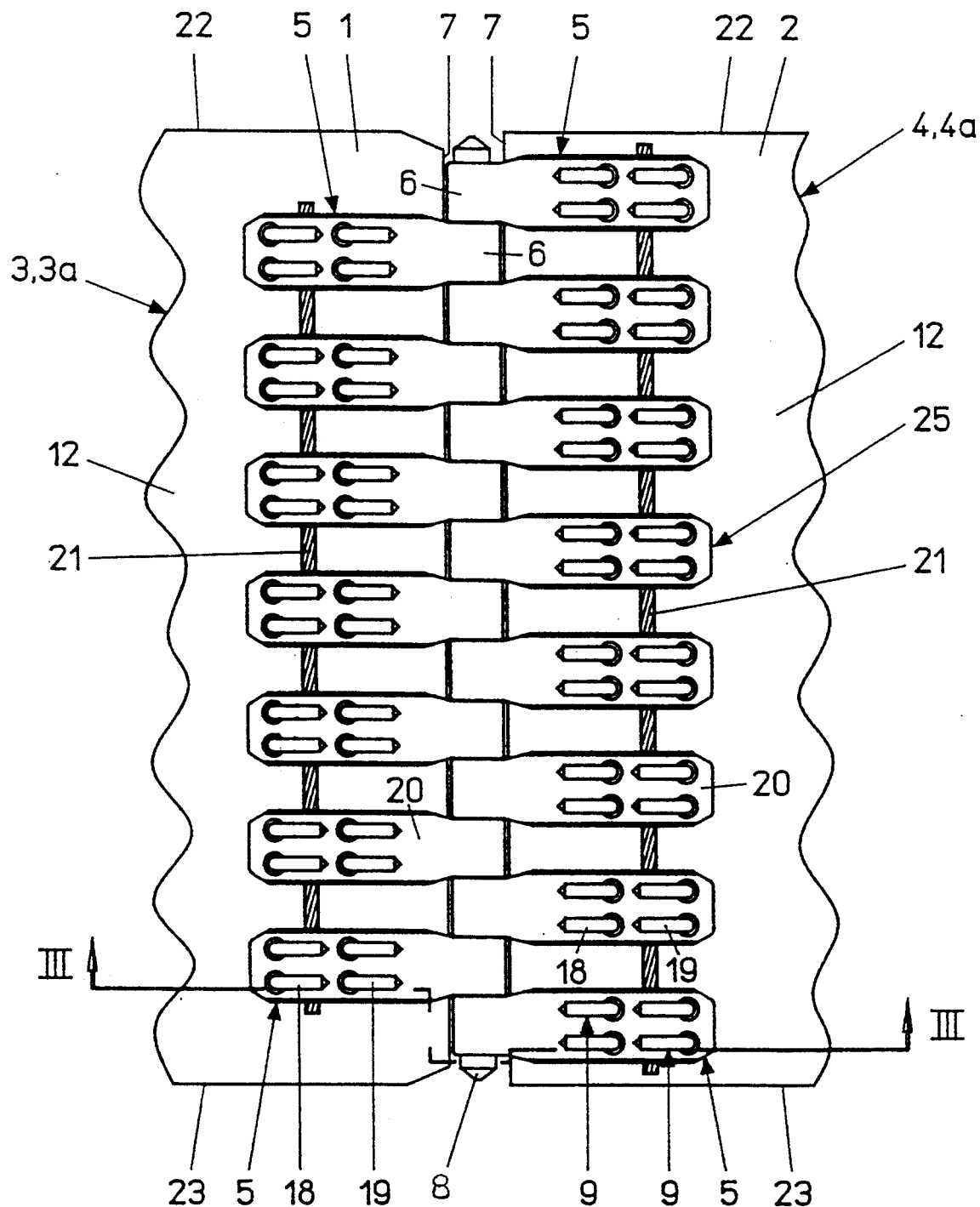
FIG. 1 is a top plan view of a belt fastener arrangement embodying the present invention, wherein U-shaped belt fasteners are shown mounted to opposite ends of a belt, and are hingedly interconnected by a coupling rod or pin.
Figure 3:
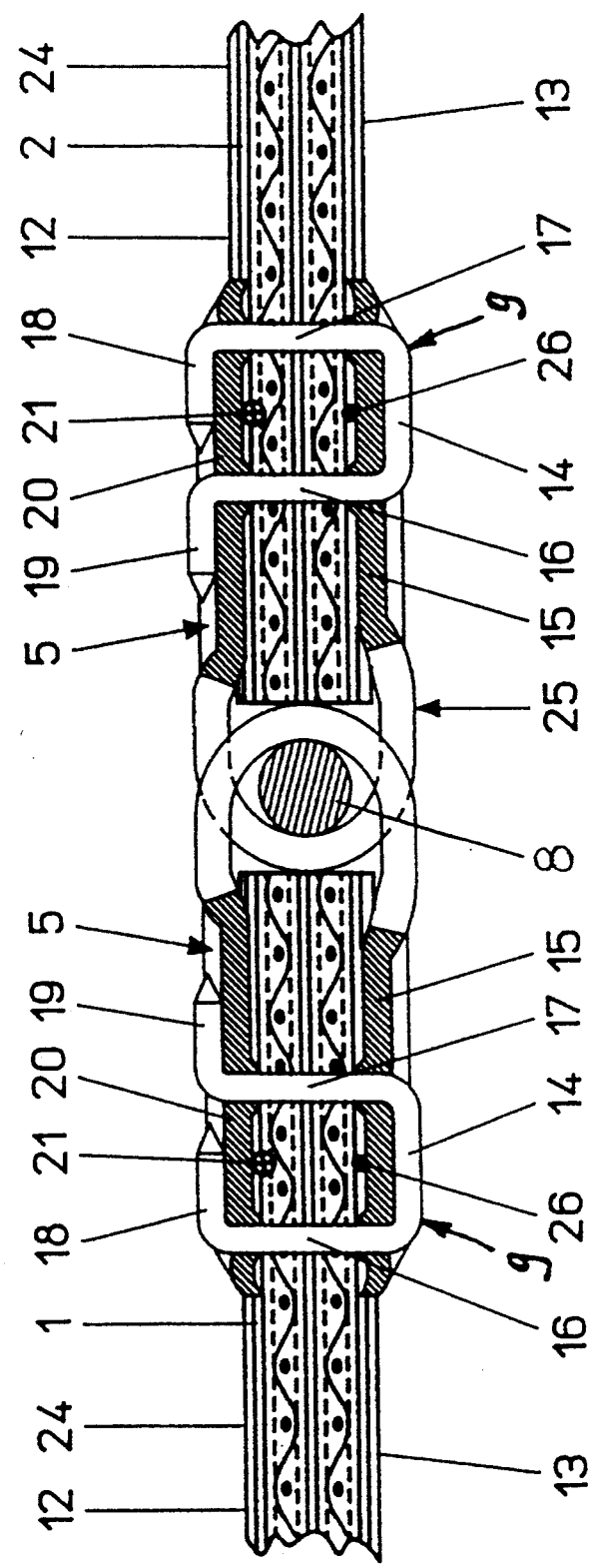
FIG. 3 is an enlarged cross-sectional view of the hinged belt fastening arrangement shown in FIG. 1, taken along the line III—III, FIG. 1.

In the example illustrated in FIGS. 1 and 3, U-shaped belt fasteners 5 are used to hingedly interconnect the opposite ends 1 and 2 of conveyor belts segments 3, 3a and 4, 4a. The loop end 6 of each of the U-shaped belt fasteners 5 protrudes outwardly from the leading terminal or edge 7 of the respective belt end 1 and 2. The opposing loop ends 6 of belt fasteners 5 are mutually aligned and intermeshed, and are hingedly joined by means of a connector pin or rod 8. In the example shown in FIGS. 1 and 3, the U-shaped belt fasteners 5 are mounted to the belt ends 1 and 2 by means of staple-like fasteners 9. However, it is to be understood that other types of fasteners are also contemplated by the present invention.

Figure 2:
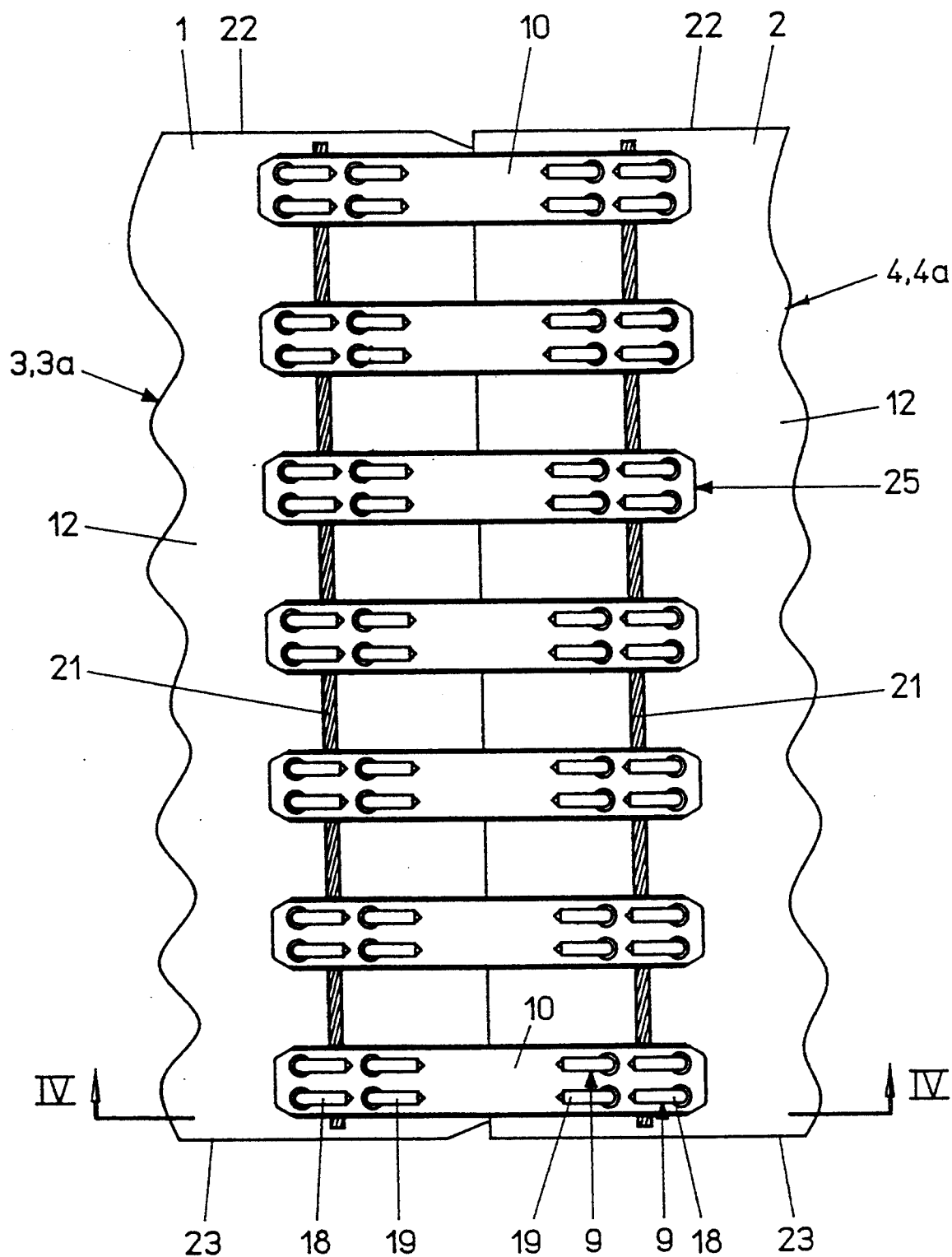
FIG. 2 is a top plan view of another embodiment of the present invention, wherein plate type belt fasteners are attached to opposite ends of a belt and interconnect the same in a non-hinged fashion.
Figure 4:
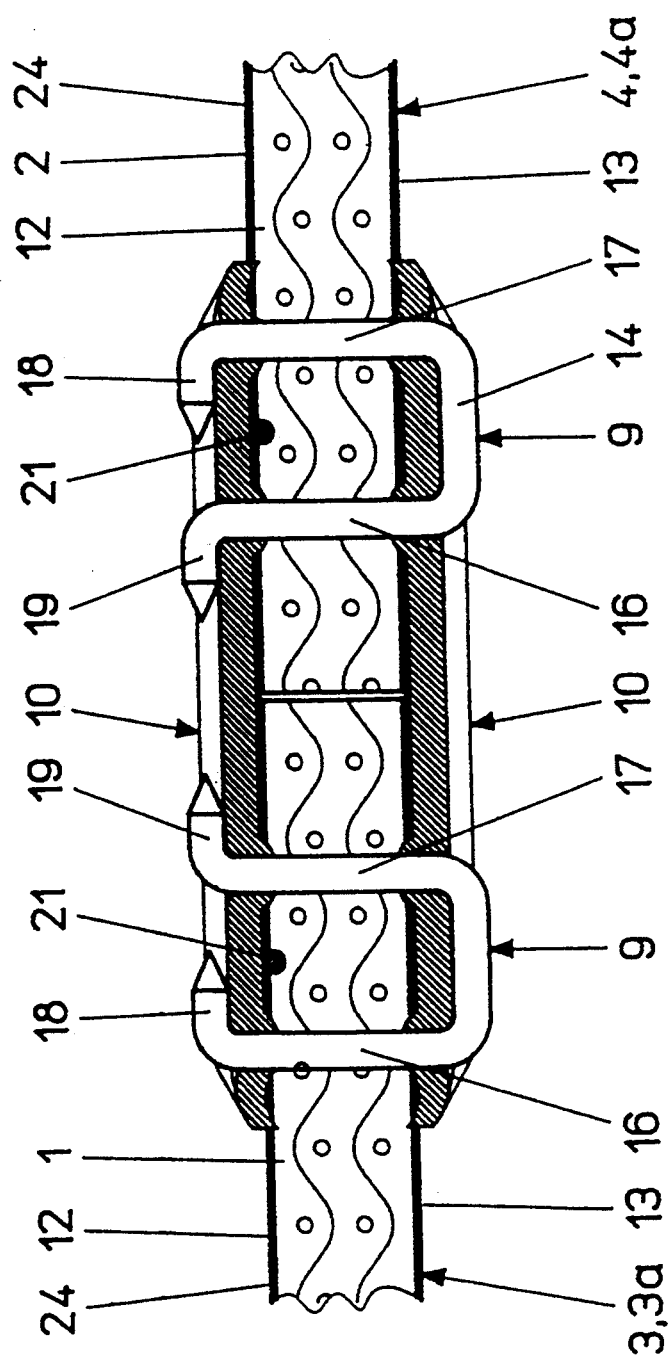
FIG. 4 is an enlarged cross-sectional view of the non-hinged belt fastener system shown in FIG. 2, taken along the line IV—IV, FIG. 2.

In the example illustrated in FIGS. 2 and 4, plate type belt fasteners 10 are positioned to bridge or overlap the junction point 11, where the respective leading edges 7 of the opposite belt ends 1 and 2 are positioned adjacent one another. The plate type belt fasteners 10 are arranged in oppositely facing pairs located adjacent the top surface 12 and the bottom surface 13 respectively of belt ends 1 and 2, and may be attached thereto by means such as the illustrated staple-like fasteners 9.

The staple-like fasteners 9 shown in both embodiments of the present invention have a generally U-shaped side elevational configuration, including a pair of opposing legs 16 and 17 and an interconnecting ridge portion 14. In the case of the U-shaped belt fasteners 5 (FIGS. 1 & 3), the bridge portion 14 of each staple 9 is positioned against the fastener leg 15 on the lower or interior side of belt ends 1 & 2. In the plate type joining elements 10 (FIG. 2 & 4), the bridge portion 14 of each staple 9 is positioned against the lower or interior plate 10. The pointed ends 18 & 19 on the legs 16 and 17 of staple fasteners 9 extend through mating apertures in belt fasteners 5 and 10, as well as through the carcass or body of belt ends 1 & 2, extending from the bottom surface 13 thereof to the top surface 12 thereof. The free end of each of the staple legs 18 and 19 is bent or crimped inwardly into position on the upper leg 20 of U-shaped belt fastener 5, and on the upper plate of plate type belt fastener 10, which is located adjacent the top surface 12 of belt ends 1 and 2. Typically, the clenching of staples 9 is accomplished sequentially across the width of belt ends 1 & 2. When the free ends of staple legs 18 and 19 are clenched or bent downwardly, a great deal of pressure is exerted on the belt material located between the legs 15 and 20 of U-shaped belt fasteners 5 shown in FIG. 3, and respectively on the belt material which is located between the two plate type joining elements 10 shown in FIG. 4.

This compression in the thickness of belt ends 1 and 2 causes the belt ends to expand or "grow" laterally, such that the overall width of the belt ends 1 and 2 tends to increase, as well as distort from its original flat condition.

With reference to FIGS. 1 and 2, a pair of tensioning elements 21 are placed on the top or exterior surface 12 of belt ends 1 and 2, and attached thereto by a suitable fastener arrangement. Each of the illustrated tensioning elements 21 covers generally the entire width of the associated belt end. More specifically, each of the illustrated tensioning elements 21 extends from one side edge of the belt end to the opposite side edge of the belt end, from the respective first belt fastener 5 or 10, up to and including the respective last belt fastener 5 or 10 respectively at each belt end 1 or 2. Tensioning elements 21 are located on the exterior or top surface 12 of belt ends 1 and 2 in such a way they lie directly under the upper or outer legs 20 of the U-shaped joining elements 5, and under the plate-shaped joining elements 10 associated with the top side 12 of belt ends 1 and 2 (FIG. 4). When the belt splice or joint is being made, tensioning elements 21 are placed on the upper surfaces 12 of belt ends 1 and 2, and are preferably slightly pretensioned in a longitudinal direction. When the free ends of the staple legs 18 and 19 are bent downwardly, tensioning elements 21 are pressed toward and into the top surface 12 of the belt ends 1 and 2. Tensioning elements 21 prevent the corrugation and/or undulation of the belt ends 1 and 2, as well as the cupping or curved deformation of the belt ends 1 and 2 by keeping the belt fasteners 5 and 10 at fixed distances laterally with respect to one another. Thus, when belt fasteners 5 and 10 are being mounted to the belt ends 1 and 2, the belt material cannot expand freely in a lateral direction, since its position is fixed from one belt side edge 22 to the other belt side edge 23 by tensioning elements 21.

Tensioning elements 21 serve as a means suitable for taking up tensile forces occurring in longitudinal direction. Hence, tensioning-elements 21 are constructed from material having low elasticity and high tensile strength. For this purpose, tension elements 21 are preferably of an elongate, relatively narrow construction, such as a rod, ribbon, bar or the illustrated braided cable. However, it is to be understood that tensioning element 21 may assume other alternative configurations.

As best illustrated from the drawings, tensioning elements 21 are preferably arranged parallel to the leading edges 7 of belt ends 1 and 2, and extend across the entire width of conveyor belt 3 and 4. In the illustrated example, tensioning elements 21 are positioned a predetermined, spaced apart distance from the leading area or edge of their respective belt end 1 and 2. Furthermore, when staple-like fasteners 9 are used to mount the belt fasteners to the belt, each tensioning element 21 is preferably positioned between the two staple legs 16 and 17. Prior to bending the free ends of staple legs 18 and 19, each tensioning element 21 is positioned directly on the top surface 24 of the respective belt end 1 or 2. When the free ends of staple legs 18 and 19 are pressed downwardly into the crimped condition illustrated in FIGS. 3 and 4, tensioning element 21 is pressed into the top surface 12 of the respective belt end 1 and 2.

The softer the belt material is, the greater beneficial effect tensioning elements 21 will provide. The effect of tensioning elements 21 is highly efficient, especially when conveyor belts 3 and 4 are made with high rubber content. The advantages of tension elements 21 are experienced not only when tension elements 21 are slightly tensioned prior to attachment, but also when they are simply placed loose in the fastener arrangement. It is preferred that both ends 1 and 2 of the belt be equipped with a tensioning element 21.

Furthermore, tensioning element 21 is quite useful, particularly when multiple U-shaped belt fasteners 5 are used, as shown in FIG. 3, wherein a wire-like holding part or connector bar 26 interconnects adjacent joining elements 5. Such connector bars 26 are merely soldered to the lower legs 15 of the adjacent belt fasteners 5 to retain them in a laterally spaced apart fashion prior to assembly onto belt ends 1 & 2. Connector bars 26 typically become detached from the legs 15 of belt fasteners 5 when the free legs 18 and 19 of staple 9 are being bent downwardly. Since connector bars 26 are detached from the staple legs during the clenching operation, they do not provide lateral support to the belt ends, as do tension elements 21.

It is to be understood that tensioning elements 21 may also be provided on the bottom or interior surfaces 13 of belt ends 1 and 2. However, due to the conventional construction of most conveyor belts, which have a softer top or exterior surface than bottom or interior surface, this is typically not necessary to avoid belt distortion.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which are exclusive property or privilege is claimed are defined as follows.

What is claimed is:

1. A method for interconnecting opposite ends of a belt, comprising:
    providing a plurality of individual belt fasteners, each with spaced apart mounting portions between which an associated belt end is positioned;
    positioning the individual belt fasteners side-by-side across the width of both of the belt ends;
    positioning a longitudinally inelastic, continuous tensioning element transversely across a major portion of at least one of the belt ends and attaching the same thereto;
    mounting the individual belt fasteners by impressing the mounting portions of each into the opposing faces of the belt ends, such that the tensioning element resists lateral expansion of the one belt end and alleviates distortion thereof.

2. A method as set forth in claim 1, wherein:
    said tensioning element attaching step comprises longitudinally pretensing the tensioning element prior to said belt fastener mounting step.

3. A method as set forth in claim 2, wherein:
    said tensioning element attaching step comprises positioning the tensioning element between a selected face of the one belt end and the adjacent mounting portions of the associated belt fasteners before said fastener mounting step, such that as the mounting portions of the belt fasteners are impressed into the opposite faces of the belt ends, the tensioning element is contemporaneously pressed into the selected belt face to frictionally interconnect the same with the one belt end and each of the associated belt fasteners.

4. A method as set forth in claim 3, wherein:
    said tensioning element attaching step includes positioning the tensioning element on the outwardly oriented face of the one belt end.

5. A method as set forth in claim 4, wherein:
    said fastener mounting step comprises sequentially clenching each pair of fastener mounting portions into the opposite faces of the belt ends.

6. A method as set forth in claim 5, wherein:
    said tensioning element attaching step includes positioning the tensioning element generally parallel to a terminal edge of the one belt end.

7. A method as set forth in claim 6, wherein:
    said tensioning element positioning step includes extending the tensioning element across the entire width of the one belt end.

8. A method as set forth in claim 7, including:
    positioning a longitudinally inelastic tensioning element transversely across a major portion of an outwardly oriented face of the other of the belt ends and attaching the same thereto.

9. A method as set forth in claim 8, wherein:
    said tensioning element comprises an elongated strip having low elasticity and high tensile strength.

10. A method as set forth in claim 9, wherein:
    said tensioning element comprises a cable.

11. A method as set forth in claim 10, wherein:
    said fastener mounting step includes inserting staples through the mounting portions of the belt fasteners and those portions of the belt ends disposed therebetween.

12. A method as set forth in claim 11, wherein:
said staples are U-shaped, and include a pair of legs disposed in a plane oriented generally perpendicular to the terminal edges of the belt ends; and
said tensioning element attaching step includes inserting the tensioning element between the legs of each of the staples.

13. A method as set forth in claim 1, wherein:
said tensioning element attaching step comprises positioning the tensioning element between a selected face of the one belt end and the adjacent mounting portions of the associated belt fasteners before said belt mounting step, such that as the mounting portions of the belt fasteners are impressed into the opposite faces of the belt ends, the tensioning element is contemporaneously pressed into the selected belt face to frictionally interconnect the same with the one belt end and each of the associated belt fasteners.

14. A method as set forth in claim 1, wherein:
said tensioning element attaching step includes positioning the tensioning element on the outwardly oriented face of the one belt end.

15. A method as set forth in claim 1, wherein:
said fastener mounting step comprises sequentially impressing each pair of fastener mounting portions into the opposite faces of the belt ends.

16. A method as set forth in claim 1, wherein:
said tensioning element attaching step includes positioning the tensioning element generally parallel to the terminal edge of the one belt end.

17. A method as set forth in claim 1, wherein:
said tensioning element positioning step includes extending the tensioning element across the entire width of the one belt end.

18. A method as set forth in claim 1, including:
positioning a longitudinally inelastic tensioning element transversely across a major portion of an outwardly oriented face of the other of the belt ends and attaching the same thereto.

19. A method as set forth in claim 1, wherein:
said tensioning element comprises a cable.

20. A method as set forth in claim 1, wherein:
said fastener mounting step includes inserting staples through the mounting portions of the belt fasteners and those portions of the belt ends disposed therebetween.

21. A method as set forth in claim 20, wherein:
said staples are U-shaped, and include a pair of legs disposed in a plane oriented generally perpendicular to the terminal edges of the belt ends; and
said tensioning element attaching step comprises inserting the tensioning element between the legs of each of the staples.

22. An arrangement for interconnecting opposite ends of a belt, comprising:
a plurality of individual belt fasteners arranged side-by-side across the width of the belt ends to securely interconnect the same, wherein said belt fasteners include spaced apart mounting portions which are sequentially converged against and impressed into opposing faces of the belt ends such that the overall width of the belt ends tends to thereby expand and distort;
an elongate tensioning element extending continuously along a major portion of at least one of the belt ends, and positioned between one of the belt faces and the adjacent mounting portions of said belt fasteners; said tensioning element being longitudinally inelastic, whereby as the mounting portions of said belt fasteners are sequentially impressed into the opposite faces of the belt ends, said tensioning element is contemporaneously pressed into the one belt face and thereby frictionally interconnected with the associated belt end and said belt fasteners, so as to generally maintain the overall width of the associated belt end and resist distortion thereof.

23. An arrangement as set forth in claim 22, wherein:
said tensioning element is longitudinally pretensed prior to impressing the mounting portions of said belt fasteners into the opposing faces of the belt ends.

24. An arrangement as set forth in claim 23, wherein:
said tensioning element is configured to be positioned on an outwardly oriented face of the one belt end.

25. An arrangement as set forth in claim 24, wherein:
said tensioning element is shaped to extend across the entire width of the one belt end.

26. An arrangement as set forth in claim 25, including:
a second longitudinally inelastic tensioning element positioned transversely across a major portion of an outwardly oriented face of the other of the belt ends and attached thereto.

27. An arrangement as-set forth in claim 26, wherein:
said tensioning element comprises an elongated strip having low elasticity and high tensile strength.

28. An arrangement as set forth in claim 27, wherein:
said tensioning element comprises a cable.

29. An arrangement as set forth in claim 28, including:
staples inserted through the mounting portions of said belt fasteners and those portions of the belt ends disposed therebetween.

30. An arrangement as set forth in claim 29, wherein:
said staples are U-shaped, and include a pair of legs disposed in a plane oriented generally perpendicular to the terminal edges of the belt ends; and
said tensioning element is inserted between the legs of each of said staples.

31. A belt having opposite ends thereof interconnected by a fastener arrangement, comprising:
a plurality of individual belt fasteners arranged side-by-side across the width of said belt ends to securely interconnect the same, wherein said belt fasteners include spaced apart mounting .portions which are sequentially converged against and impressed into opposing faces of said belt ends such that the overall width of said belt ends tends to thereby expand and distort;
an elongate tensioning element extending continuously along a major portion of at least one of said belt ends, and positioned between one of said belt faces and the adjacent mounting portions of said belt fasteners; said tensioning element being longitudinally inelastic, whereby as the mounting portions of said belt fasteners are sequentially impressed into the opposite faces of said belt ends, said tensioning element is contemporaneously pressed into said one belt face and thereby frictionally interconnected with the associated belt end and said belt fasteners, so as to generally maintain the overall width of said associated belt end and resist distortion thereof.

32. An arrangement as set forth in claim 31, wherein:

said tensioning element is longitudinally pretensed prior to impressing the mounting portions of said belt fasteners into the opposite faces of said belt ends.

33. A belt as set forth in claim 32, wherein: said tensioning element is positioned on an outwardly oriented face of said one belt end.

34. A belt as set forth in claim 33, including:
a second longitudinally inelastic tensioning element positioned transversely across a major portion of an outwardly oriented face of the other of the belt ends and attaching the same thereto.

* * * * *